United States Patent
Green et al.

(10) Patent No.: US 6,179,211 B1
(45) Date of Patent: Jan. 30, 2001

(54) METHOD OF IDENTIFYING A DATA CARRIER

(75) Inventors: Ian MacDonald Green, London; Simon Nicholas Murray Willcock, High Wycombe, both of (GB)

(73) Assignee: Central Research Laboratories Limited, Middlesex (GB)

( * ) Notice: Under 35 U.S.C. 154(b), the term of this patent shall be extended for 0 days.

(21) Appl. No.: 09/117,336

(22) PCT Filed: Jan. 14, 1997

(86) PCT No.: PCT/GB97/00101
  § 371 Date: Dec. 8, 1998
  § 102(e) Date: Dec. 8, 1998

(87) PCT Pub. No.: WO97/27565
  PCT Pub. Date: Jul. 31, 1997

(30) Foreign Application Priority Data

Jan. 25, 1996 (GB) .................................................... 9601463

(51) Int. Cl.[7] .................................................. G06K 19/06
(52) U.S. Cl. ........................................... 235/493; 235/380
(58) Field of Search .................................. 235/380, 449, 235/493, 375, 379; 705/41

(56) References Cited

U.S. PATENT DOCUMENTS

| 4,469,937 | * | 9/1984 | Stockburger et al. | 235/435 |
| 4,645,916 | * | 2/1987 | Raisleger | 235/449 |
| 4,707,593 | * | 11/1987 | Murata et al. | 235/487 |
| 4,992,646 | * | 2/1991 | Collin | 235/375 |
| 4,998,009 | * | 3/1991 | Iijima et al. | 235/487 |
| 5,151,582 | * | 9/1992 | Toshinori | 235/469 |

FOREIGN PATENT DOCUMENTS

| 1 331 604 | 9/1973 | (GB) . |
| 2 021 835 | 12/1979 | (GB) . |
| 2 272 092 | 5/1994 | (GB) . |

* cited by examiner

*Primary Examiner*—Thien M. Le
(74) *Attorney, Agent, or Firm*—Evenson, McKeown, Edwards & Lenahan, P.L.L.C.

(57) ABSTRACT

A method of identifying a data carrier such as a credit card, benefit card, access control card, identity card or stored value card, carrying data in the form of a plurality of rational number in a sequence, successive numbers having a marker between them, comprises a) measuring the distance from a fixed point on the data carrier to a given part of a marker, b) dividing this distance by the distance between corresponding give parts of successive markers, thereby obtaining a rational number, and c) subtracting this rational number from the number in the sequence adjacent the marker in a given direction, thereby obtaining a further rational number which is capable of identifying the data carrier uniquely.

6 Claims, 1 Drawing Sheet

METHOD OF IDENTIFYING A DATA CARRIER

Figure 1:
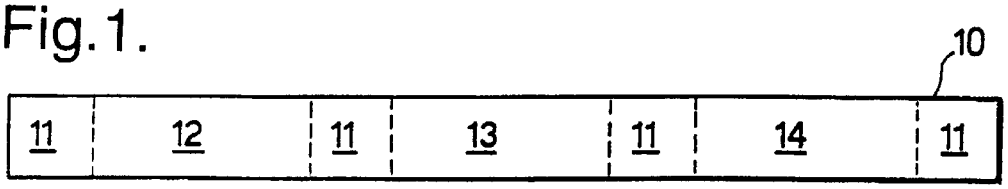

This invention relates to a method of identifying a data carrier, and particularly, though not exclusively, to reading codes stored in a security element attached to a card or document as a permanent pattern of a magnetic property detectable, for example, as a variation of remanent magnetisation along the element.

A data carrier of this kind is described in GB-A-1,331,604 in which in spaced regions of an element anisotropic magnetic particles are dispersed and fixedly aligned in a binder along a preset direction, whilst in remaining regions the particles are not so aligned or are aligned along a substantially different preset direction. This arrangement is commonly described as a magnetic "watermark" or as forming a "permanent magnetic structure" since unlike conventional magnetic recordings the pattern of remanent magnetisation revealed by uniaxially magnetising or "developing" the document can be restored by re-magnetisation even after erasure by the application of an a.c. erase field, for example. A magnetic "watermark" is particularly well suited to recording data in digital form since each alignment direction may be assigned a different significance i.e. a binary "ONE" or a binary "ZERO".

Due to the "built-in" nature of the recording, a security element may conveniently be prepared as a single "watermarked" tape comprising strings of binary coded numbers (usually grouped in characters) which provide a security feature when cut from the tape and applied to a support to form a document or card. Typically each string of numbers is separated by a marker or "sentinel" comprising a unique sequence of bits which itself never appears in the security data. For this reason the "sentinel" can always be identified so that by reference to its position on the document the bits chosen to represent the security data (a particular set of characters appearing on the document, for example) can always be recovered.

However, due to tolerancing problems during manufacture of the tape and problems of registration between the tape and the support it is not possible without recourse to the use of expensive equipment, to ensure that a "sentinel" or "sentinels" always appear in the same position on the document.

In practice, when one "sentinel" appears at each end of the document the bits between the "sentinels" are chosen represent the security data. It sometimes occurs, however, that only one "sentinel" appears on the document so that depending upon the exact location an appropriate number of bits, selected from both sides of the "sentinel", are chosen to represent the security data identifying that document. Thus for each position of the first detected "sentinel" there is a different bit selection rule for choosing the bits constituting the security data. The sequence of bits representing the security data may then be used as verification information, or may be used to derive verification information, which for example, the user may have to supply before the card is validated.

This technique, however, has a weakness for the case when the first "sentinel" on the card is close to its edge. In such a case it is possibly for the card reader to fail to detect the first "sentinel" and instead pick up the second "sentinel" on the card. Thus there is always the possibility of an ambiguity. For instance suppose that a card is made in a factory, and a piece of magnetic tape is attached to the card, the tape having the number 300 together with parts of the numbers 299 and 301. The card is read in the factory and the identification number 300 is obtained. Without knowing how the "sentinels" lie with respect to the edge of the card, it is possible for card readers in the field to recognise the identification number of the card as 299, 300 or 301. This is clearly undesirable for cards for use in financial transactions, as it might be possible to confuse two cards having adjoining lengths of "watermarked" tape attached to them. It is also undesirable for cards used for claiming benefit, or access control, or identification, or having a stored value such as prepaid fare cards.

In order to solve this problem, "WATERMARK" tape made by THORN Security Science Ltd, Swindon, England, is often applied to cards in a registered fashion such that the "sentinels" always occur at the same point on a card. Increased production costs are associated with such registered cards. An alternative solution, described in GB-A2, 021,835, is to erasably record the position of the marker According to the invention, there is provided a method of identifying a data carrier according to the claims. This can provide the advantage of identifying the data carrier uniquely without having to resort to expensive registration schemes to ensure that the markers are always at exactly the same position on the data carrier.

In order to guarantee that the data carrier will be identified uniquely, it is necessary that each rational number in the sequence should not be repeated and the difference between successive numbers must be equal to or greater than one. In practice, it is sufficient to have a long enough sequence so that in use the card or document becomes outdated before the sequence is repeated. Successive markers are most conveniently arranged to be displaced in a single given direction. Preferably successive markers are equally spaced from one another.

Preferably, the data carrier comprises a document or card carrying a security element having data encoded thereon as a permanent pattern of a detectable magnetic property, and the fixed point on the data carrier is constituted by an edge of the document or card. This simplifies the measurement of the distance in part a) of the above mentioned method.

Figure 2:
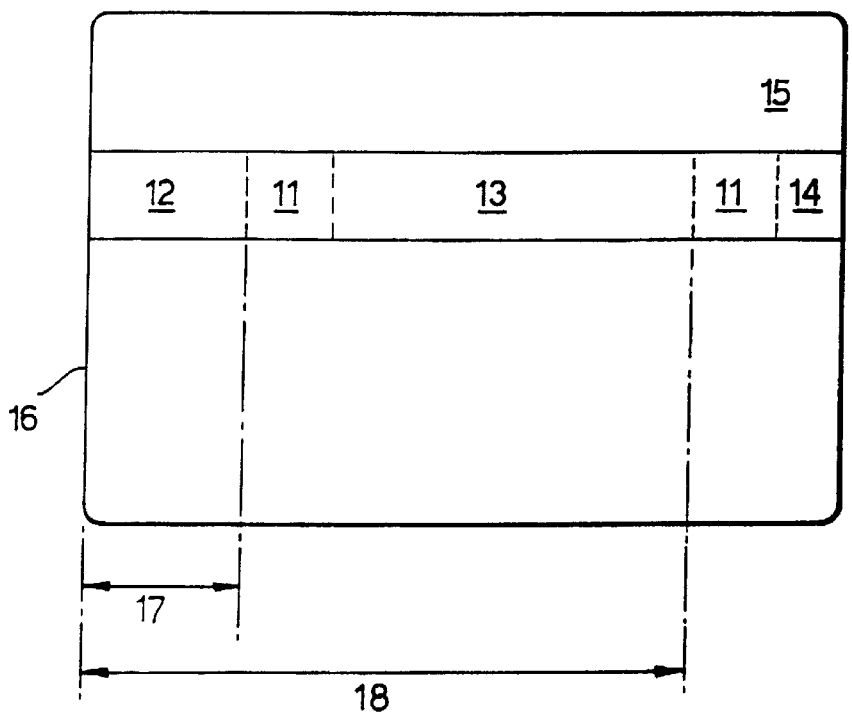
Figure 3:
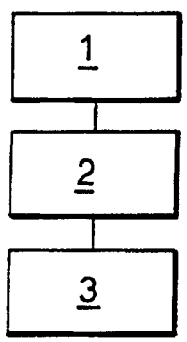

Embodiments of the present invention will now be described, by way of example only, with reference to the accompanying diagrammatic drawings, in which FIG. 1 shows a length of magnetically encoded tape constituting a security element, FIG. 2 shows a data carrier in the form of a card, and FIG. 3 shows a block diagram of a method according to the invention.

In FIG. 1, a length of "WATERMARK" tape (10) obtainable from Thorn Secure Science Ltd, Swindon, England is shown schematically. The tape has a permanently magnetised structure. The data encoded thereon comprises markers known as start sentinels (11), having identification numbers (12, 13, 14) in the form of binary digits therebetween. The identification numbers are in a sequence comprising the integers arranged in ascending magnitude, for example 300, 301, 302, 303 etc.

FIG. 2 shows a piece of the tape of FIG. 1 attached to a credit card 15. The distance between the edge of the card 16 and the start of the first marker or start sentinel (x) is denoted in FIG. 2 by the reference numeral 17. The distance between the edge of the card 16 and the start of the second marker or start sentinel is denoted in FIG. 2 by the reference numeral 18.

The inventors have realised that by treating the identification number not as a sequence of integers but as a continuously varying quantity it is possible to remove the ambiguity inherent in other methods of identifying adjoining parts of the tape.

Each identification number is deemed to start at the beginning of the marker or start sentinel to the left of the identification number in FIG. 2. The beginning of the start sentinel before the identification number N is therefore at analogue position N.000 (e.g. 0.000 if N=0). The measuring means comprises a magnetic read head which looks for the first marker or start sentinel. As well as reading the number which follows the marker, the measuring means measures the distance (x, 17) between the edge of the card 16 and the beginning of the first marker. This analogue distance is then expressed as a fraction of the marker pitch by dividing x by the distance between the markers (i.e. 18–17).

Evaluating the fraction is normally straightforward. The data on cards is generally set down at a constant pitch and is designed to be self clocking. For example, "WATER-MARK" data is commonly encoded at a constant pitch of 33 bits per inch, and might in one embodiment have 70 bits between the beginning of successive start sentinels. By counting the number of bits received before the first recognised start sentinel and dividing by 70 one obtains the distance between the edge of the card and the first start sentinel expressed as a fraction between 0 and 1. As an example, if 22 bits are received before the first start sentinel, one obtains 22/70=0.31. The corresponding identification number if the following number is N is therefore the number N minus 0.31.

If decoding were started from the second start sentinel instead of the first, the number of bits before that start sentinel would be 92. Thus x would be 92/70=1.31. The decoded number following the start sentinel in this case is N+1,, and thus subtracting this from N+1 gives N minus 0.31 as before. Clearly the technique will work in this case if one adds 1−x instead of subtracting x. The technique will also work if one adds x, but only if the sequence is integers decreasing in magnitude (e.g. by reading the card in the opposite direction and measuring from the trailing edge of the card).

Although the end of the number denoted by 14 in FIG. 2 is missing from the card 15, it may be reconstructed by a suitable algorithm working from the available part of 14 and the latter part of 13 which precedes the start sentinel.

An embodiment of a method according to the invention is shown as a block diagram in FIG. 3. In this Figure the blocks have the following significances.

Block 1 denotes measuring the distance from a fixed point on the data carrier to a given part of a marker, block 2 denotes dividing this distance by the distance between corresponding given parts of successive markers, thereby obtaining a rational number (x), and block 3 denotes adding or subtracting this rational number (x) to (from) the number in the sequence adjacent the said marker in a given direction, thereby obtaining a further rational number which is capable of identifying the data carrier uniquely.

Finally, the content of the priority document for the present application (particularly the figures and abstract) is incorporated herein by reference.

What is claimed is:

1. A method of identifying a data carrier (15) carrying data in the form of a plurality of different numbers (12, 13, 14), expressible as integers in a monotonically increasing or decreasing sequence, successive numbers having a marker (11) between them, the markers being equally spaced from one another, the method including:
   a) measuring the distance (17) from a fixed point on the data carrier (16) to a given part of a marker,
characterised in that the method further includes or comprises
   b) dividing this distance (17) by the distance between corresponding given parts of successive markers, thereby obtaining a rational number (x), and
   c) subtracting this rational number (x) from the number in the sequence adjacent the said marker if the numbers in the sequence increase in the read direction, or adding this rational number (x) to the number in the sequence adjacent the said marker if the numbers in the sequence decrease in the read direction, thereby obtaining a further rational number which is capable of identifying the data carrier uniquely.

2. A method as claimed in claim 1 in which the data carrier comprises a document or card carrying a security element (10) having data encoded on it as a permanent pattern of a detectable magnetic property.

3. A method as claimed in claim 2 in which the markers are constituted by a permanent pattern of a detectable magnetic property encoded on the security element.

4. A method as claimed in claim 1 in which the fixed point on the data carrier is constituted by an edge of the document or card.

5. A method as claimed in claim 2 in which the fixed point on the data carrier is constituted by an edge of the document or card.

6. A method as claimed in claim 3 in which the fixed point on the data carrier is constituted by an edge of the document or card.

* * * * *